US011785468B2

(12) United States Patent
Chandrappa et al.

(10) Patent No.: US 11,785,468 B2
(45) Date of Patent: Oct. 10, 2023

(54) SUBSCRIBER IDENTIFICATION MODULE (SIM) MANAGEMENT FOR CLOUD-BASED PRIVATE MOBILE NETWORKS

(71) Applicant: Microsoft Technology Licensing, LLC, Redmond, WA (US)

(72) Inventors: Harish Kumar Chandrappa, Bothell, WA (US); Karthik Ananthakrishnan, Woodinville, WA (US); Nikhil Kumar Ravi, Redmond, WA (US); SaiChandu Maddipati, Redmond, WA (US); Cong Li, Redmond, WA (US); Vineet Gahrewal, Redmond, WA (US); Vrishali Bhor, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 17/357,772

(22) Filed: Jun. 24, 2021

(65) Prior Publication Data
US 2022/0279354 A1    Sep. 1, 2022

Related U.S. Application Data

(60) Provisional application No. 63/154,648, filed on Feb. 26, 2021.

(51) Int. Cl.
*H04W 8/18* (2009.01)
*H04W 12/30* (2021.01)
(Continued)

(52) U.S. Cl.
CPC ............. *H04W 12/35* (2021.01); *H04W 8/24* (2013.01); *H04W 12/0433* (2021.01); *H04W 12/086* (2021.01)

(58) Field of Classification Search
CPC ........... H04W 12/0433; H04W 12/086; H04W 12/35; H04W 12/40; H04W 8/18; H04W 8/24; H04W 84/105
See application file for complete search history.

(56) References Cited

U.S. PATENT DOCUMENTS 10,700,928 B2 *   6/2020   Li ....................... H04L 41/0806
11,012,294 B2 *   5/2021   Ratnasamy ............. H04L 43/20
(Continued)

FOREIGN PATENT DOCUMENTS

WO          2019179925 A1      9/2019

OTHER PUBLICATIONS

"Key Issue: UE Onboarding and Provisioning for Non-Public Networks", In Proceedings of 3GPP TSG-SA3 Meeting #100-e, Aug. 17, 2020, 3 Pages.
(Continued)

*Primary Examiner* — Liton Miah
(74) *Attorney, Agent, or Firm* — RAY QUINNEY & NEBEKER P.C; James Bullough

(57) ABSTRACT

The present disclosure relates to devices, methods, and systems for subscriber identification module (SIM) management for a private mobile network. The methods and systems may include a private mobile network service on a cloud computing system. Users of the cloud computing system may use the private mobile network service to create a private mobile network. The private mobile network service may facilitate the creation of the private mobile network by providing interfaces for secure communications with the users of the cloud computing system, the SIM service partners, and the packet core partners. The mobile network service may also manage the SIM cards for the private mobile networks by coordinating the transmission of the SIM operation details for the SIM cards.

20 Claims, 10 Drawing Sheets

(51) Int. Cl.
*H04W 12/086* (2021.01)
*H04W 8/24* (2009.01)
*H04W 12/0433* (2021.01)

(56) References Cited

U.S. PATENT DOCUMENTS

| | | |
|---|---|---|
| 2014/0087691 A1 | 3/2014 | Babbage et al. |
| 2017/0099601 A1* | 4/2017 | Prabdial ................. H04W 8/04 |
| 2019/0373471 A1* | 12/2019 | Li ....................... H04L 63/0853 |
| 2019/0380027 A1 | 12/2019 | Thorn |
| 2021/0058784 A1 | 2/2021 | Kedalagudde et al. |

OTHER PUBLICATIONS

"International Search Report and Written Opinion Issued in PCT Application No. PCT/US22/016896", dated May 16, 2022, 14 Pages.

* cited by examiner

SUBSCRIBER IDENTIFICATION MODULE (SIM) MANAGEMENT FOR CLOUD-BASED PRIVATE MOBILE NETWORKS

CROSS-REFERENCE TO RELATED APPLICATIONS

This application claims priority to and the benefit of U.S. Provisional Patent Application No. 63/154,648, filed on Feb. 26, 2021, which is hereby incorporated by reference in its entirety.

BACKGROUND

Subscriber identification module (SIM) providers typically issue SIMs in batches (e.g., one thousand SIMs or two thousand SIMs in one batch) for use with a network. The SIMs are used by devices for accessing the network. The network may identify the devices using the SIMs and may ensure that the correct devices are accessing the network. Every SIM in the batch is typically programmed with secrets directly or derived from the same operator key from the network providers. A SIM ceremony occurs where the SIM provider and the network provider exchange the keys for the SIMs and other secure information so that the SIM cards may access the network provided by the network provider. Thousands of SIM cards may be authenticated at one time for use with the network. A network provider is generally managing one global network and the SIM ceremony ensures the exchange of the correct keys so that the sender and the receiver may encrypt and/or decrypt SIMs in the future. As such, the SIM secrets are typically derived from global keys at the network provider. However, when a user creates a private mobile network, the number of SIMs requested for the private mobile network may be fewer than a typical batch of SIMs. Moreover, instead of one network provided by the network provider, there may be thousands of private mobile networks. Thus, challenges may arise in managing SIMs for the private mobile networks.

SUMMARY

In accordance with one aspect of the present disclosure, a method is disclosed for subscriber identification module (SIM) management for a private mobile network using a private mobile network service on a cloud computing system. The method includes generating Ki and operator code (OPc) values in the private mobile network service substituting subscriber identification module (SIM) ceremonies for each private mobile network. The method also includes exchanging the Ki and OPc values with SIM partners through application programming interface (APIs). The Ki and OPc values are programmed during manufacturing SIM cards. The method also includes exchanging a transport key to securely exchange SIM secrets with a SIM partner that provides SIM cards. The method also includes receiving a request from a user to establish a private mobile network provided by the cloud computing system. The request identifies the SIM partner for providing the SIM cards for devices to use on the private mobile network. The method also includes receiving, from the SIM partner, encrypted SIM operations details for each SIM profile of the SIM cards for use with the private mobile network. The method also includes decrypting the encrypted SIM operations details using the transport key. The method also includes securely storing the SIM operations details for each SIM profile for use with the private mobile network.

The method may also include securely transmitting the SIM operations details to a packet core partner for use with the private mobile network.

The packet core partner may store the SIM operations details for the private mobile network and may perform an authentication of devices trying to access the private mobile network using the SIM operation details.

The SIM operations details may include an international mobile subscriber identity (IMSI) values and integrated circuit card identifier (ICCID) values for the SIM cards.

The SIM operations details may further include for each SIM profile of the SIM cards, the Ki value and the OPc value.

The request may further include an identification of one or more of international mobile subscriber identity (IMSI) values for the SIM cards, a public land mobile network (PLMN) for the private mobile network, one or more locations for the private mobile network, or a network name for the private mobile network.

The method may further include performing one or more conflict checks to verify that the IMSI values or the PLMN are not already in use by other networks in the cloud computing system.

The SIM provider may be one of a plurality of SIM partners associated with the cloud computing system.

The method may further include providing a service key for the private mobile network. The service key may identify the private mobile network and the service key may be provided to the SIM provider when purchasing the SIM cards.

The SIM secrets may include a combination of the OPc values and the Ki values.

In accordance with another aspect of the present disclosure, a device is disclosed that includes one or more processors, memory in electronic communication with the one or more processors, and instructions stored in the memory. The instructions are executable by the one or more processors to generate Ki and operator code (OPc) values in a private mobile network service substituting subscriber identification module (SIM) ceremonies for each private mobile network. The instructions are further executable by the one or more processors to exchange the Ki and OPc values with a SIM partner through application programming interfaces (APIs). The Ki and OPc values are programmed during manufacturing subscriber identification module (SIM) cards. The instructions are also executable by the one or more processors to exchange a transport key to securely exchange SIM secrets with the subscriber SIM partner that provides SIM cards. The instructions are also executable by the one or more processors to receive a request from a user to establish a private mobile network provided by a cloud computing system. The request identifies the SIM partner for providing the SIM cards for devices to use on the private mobile network. The instructions are also executable by the one or more processors to receive, from the SIM partner, encrypted SIM operations details for each SIM profile of the SIM cards for use with the private mobile network. The instructions are also executable by the one or more processors to decrypt the encrypted SIM operations details using the transport key. The instructions are also executable by the one or more processors to securely store the SIM operations details for each SIM profile for use with the private mobile network.

The device may further include securely transmitting the SIM operations details to a packet core partner for use with the private mobile network.

The packet core partner may store the SIM operations details for the private mobile network and may perform an authentication of devices trying to access the private mobile network using the SIM operation details.

The SIM operations details may include an international mobile subscriber identity (IMSI) values and integrated circuit card identifier (ICCID) values for the SIM cards.

The SIM operations details may further include, for each SIM profile of the SIM cards, the Ki value and the operator code (OPc) value.

The request may further include an identification of one or more of international mobile subscriber identity (IMSI) values for the SIM cards, a public land mobile network (PLMN) for the private mobile network, one or more locations for the private mobile network, or a network name for the private mobile network.

The instructions may be further executable by the one or more processors to perform one or more conflict checks to verify that the IMSI values or the PLMN are not already in use by other networks in the cloud computing system.

The SIM provider may be one of a plurality of SIM partners associated with the cloud computing system.

The instructions may be further executable by the one or more processors to provide a service key for the private mobile network. The service key may identify the private mobile network and the service key may be provided to the SIM provider when purchasing the SIM cards.

In accordance with another aspect of the present disclosure, a method is disclosed for integrating SIM partners for private mobile networks to use with a cloud computing system. The method includes establishing an interface for communicating with a plurality of SIM partners using a private mobile network service. The method also includes exchanging with each SIM partner of the plurality of SIM partners Ki values, operator code (OPc) values, and a transport key unique to the SIM partner. The transport key is used to encrypt communications between the private mobile network service and the SIM partners. The method also includes receiving a request from a user to establish a private mobile network provided by the cloud computing system. The request identifies a SIM partner of the plurality of SIM partners for providing SIM cards for use with the private mobile network. The method also includes providing to the user a service key for the private mobile network to use when purchasing the SIM cards from the SIM partner. The service key uniquely identifies the private mobile network. The method also includes receiving, from the SIM partner in response to the purchase of the SIM cards, encrypted SIM operations details for each SIM profile of the SIM cards for use with the private mobile network. The method also includes decrypting the encrypted SIM operations details using the transport key. The method also includes securely storing the SIM operations details for each SIM profile for use with the private mobile network.

The interface may be a SIM partner application programming interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
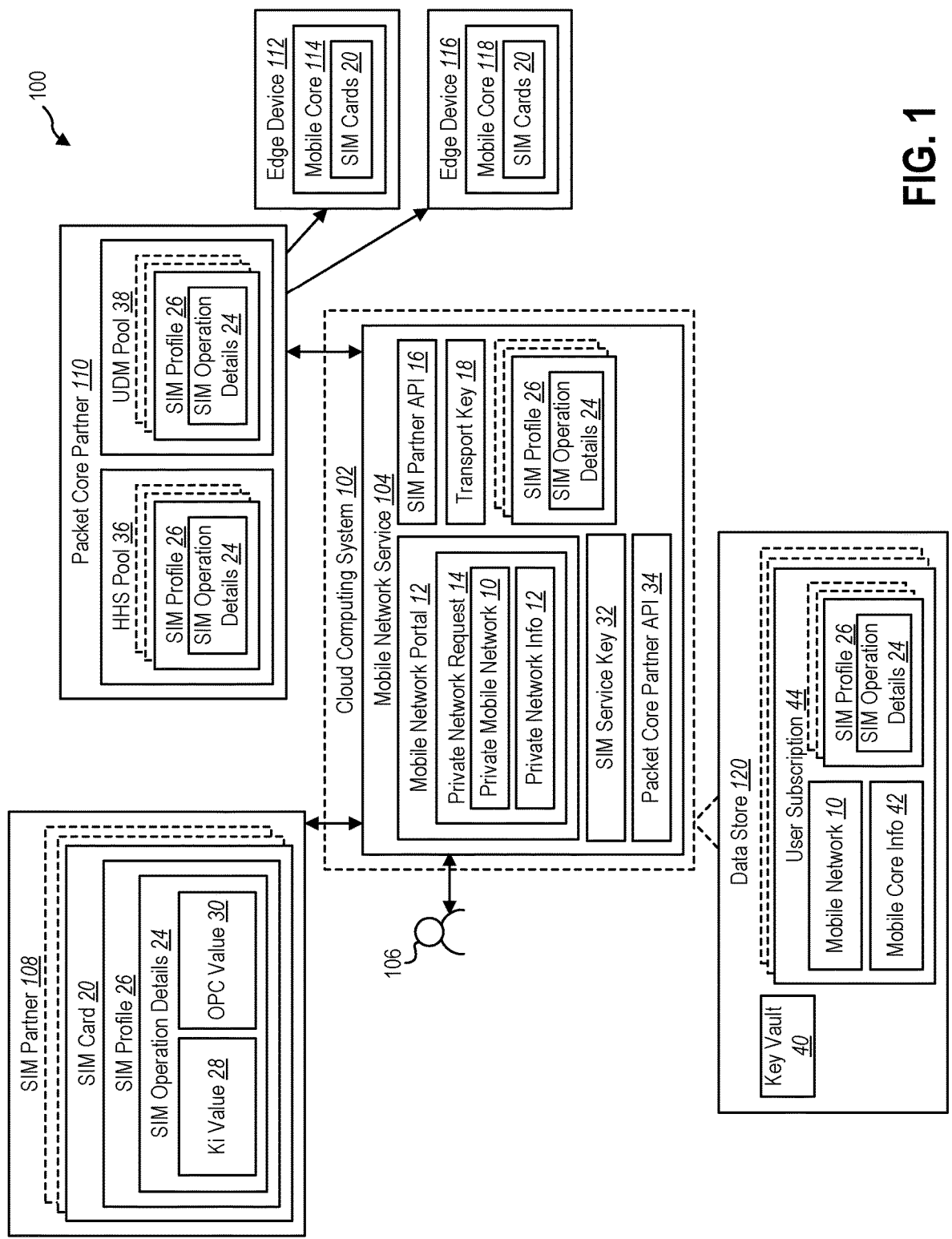
FIG. 1 illustrates an example system for creating a private mobile network using a cloud mobile network service in accordance with implementations of the present disclosure.

The present disclosure is generally related to providing private mobile networks implemented through a cloud computing system. A private mobile network may be operated for a single entity. For example, a company could have a private mobile network called "Company Name Network" that can be accessed only by devices that are configured for the private network. Access to this private mobile network can be restricted to individuals who are associated with the company (e.g., employees, customers). A private mobile network may use a combination of various technologies, including core aspects such as cellular frequency, identity, radio access network, and packet core, as well as supplementary aspects such as VNF infrastructure, routing, hybrid connectivity, and monitoring.

Subscriber identification module (SIM) providers typically issue SIMs in batches (e.g., one thousand SIMs or two thousand SIMs in one batch) for use with a network. The SIMs are used by devices for accessing the network. The network may identify the devices using the SIMs and may ensure that the correct devices are accessing the network. Every SIM in the batch is typically programmed with secrets directly or derived from the same operator key from the network providers. A SIM ceremony occurs where the SIM provider and the network provider exchange the keys for the SIMs and other secure information so that the SIM cards may access the network provided by the network provider. A network provider is generally managing one global network and the SIM ceremony ensures the exchange of the correct keys so that the sender and the receiver may encrypt and/or decrypt SIMs in the future. As such, the SIM secrets are typically derived from global keys at the network provider.

However, when a user creates a private mobile network, the number of SIMs requested for the private mobile network may be fewer than a typical batch of SIMs. Moreover, instead of one network provided by the network provider, there may be thousands of private mobile networks. As such, each time a user creates a new private mobile network for a requested number of SIMs, a SIM ceremony needs to occur for the new private mobile network to authenticate the requested number of SIMs with the private mobile network.

The present disclosure allows users of the cloud computing system to create private mobile networks using a mobile network service on the cloud computing system. The users may purchase SIMs for devices to use on the private mobile network from a trusted SIM partner (e.g., a SIM vendor) associated with the cloud computing system. Users receive, from the mobile network service, a service key identifier for the private mobile network to share with the SIM partners. After the SIM purchase is complete, the SIM vendor securely transmits relevant SIM information to the mobile network service without requiring further action from the user. The mobile network service saves this information in a secure manner and populates the relevant SIM information for the private mobile network to a home subscriber server (HSS) datastore for future activation. The user may use the mobile network service to assign one or more SIMs for the private mobile network to specific edge devices of the cloud computing system. In addition, the user may use the mobile network service to activate and/or deactivate the SIMs or a subset of the SIMs on the edge devices. As such, the mobile network service may provide users a complete managed experience for deploying a private mobile network and activating or deactivating one or more device on the private mobile network.

The mobile network service establishes secure interfaces for communicating with the customers, the SIM partners, and/or the packet core partners. For example, the mobile network service may use one or more APIs and/or portals for communicating with the different parties (e.g., the customers, the SIM partners, and/or the packet core partners). The mobile network service may also generate a plurality of keys and/or unique identifiers for providing secure transmissions between the parties.

The mobile network service manages the SIM profiles of the purchased SIM cards for the private mobile networks without providing the users access to the secure SIM profile information. The mobile network service securely receives the information from the SIM partners and securely transmits the information to the packet core partners (e.g., a packet core vendor) to implement the private mobile network using the information received from the SIM partners. The cloud computing system can implement aspects of the private mobile networks that are created for the users. As such, the mobile network service simplifies the management and creation of private mobile networks.

One example use case may include a user using the mobile network service to create a private mobile network for different factories locations across the United States. The user may have factories in Chicago, Houston, and Los Angeles. The user may want to have three robots in each of the factories connected to the private mobile network. The user may use the mobile network service to create the new private mobile network for the three factories and purchase nine SIM cards for the private mobile network. The SIM cards may be used to establish the identity of each robot in the different factories. One example may include the user using the mobile network service to activate all the robots at the factory locations. Another example may include the user using the mobile network service to only activate the robots at the Chicago factory location. Another example may include the user using the mobile network service to activate a subset of the robots at each factory location (e.g., one robot at the Chicago factory location, one robot at the Houston factory location, and one robot at the Los Angeles factory location). As such, the mobile network service may simplify the setup and management of mobile networks by providing the users an end-to-end management and monitoring experience.

One technical advantage of the present disclosure is the flexibility to onboard a plurality of SIM partners to the cloud computing system and establish a trusted relationship with the plurality of SIM partners to securely communicate user information and SIM information for the private mobile networks. Another technical advantage of the present disclosure includes the ability the scale trusted relationships among a plurality of SIM partners and/or packet core partners so that SIM partners and/or packet core partners may easily integrate with the cloud computing system for providing services for the private mobile networks.

Another technical advantage of the present disclosure is improving security for the integration of the SIM partners and/or the packet core partners by providing secure interfaces for communicating with the SIM partners and/or the packet core partners. In addition, the present disclosure manages keys used for the secure transmissions between the parties and stores the keys in a secure fashion. The present disclosure ensures that the keys remain partitioned between the users, the SIM partners, and the packet core partners so that each party only has access to the appropriate key. The present disclosure also facilitates the exchange of the keys between the SIM partners, the mobile network service, and the packet core partners.

Another technical advantage of the present disclosure is improving security by reducing a blast radius of secrets being compromised for the private mobile network. The present disclosure performs the SIM ceremony on demand for every private mobile network requested. Instead of having a single global key for the entire batch of SIMs for the network, the present disclosure provides each SIM for the private mobile network with a unique key and operator codes. By having different values stored on each SIM card used with the private mobile network, if one SIM card is compromised, only that batch of SIM cards in that order are compromised, reducing the impact to the private mobile network.

Referring now to FIG. 1, illustrated is an example system 100 for providing private mobile networks 10 implemented through a cloud computing system 102 (which may be a public cloud computing system) on one or more edge devices 112, 116. The edge devices 112, 116 may be at different mobile network sites. For example, a user 106 may want to create a private mobile network 10 using the cloud computing system 102 for different restaurant locations throughout the world. Cloud computing system 102 may facilitate the creation and deployment of the private mobile networks 10. In addition, cloud computing system 102 may provide first party network functions services to run on the edge device 112, 116.

The cloud computing system 102 can implement aspects of the private mobile networks 10 that are created for the users 106. For example, some or all of a packet core of a private mobile network can be implemented in the cloud computing system 102. Different types of deployment models can be made available for creating a private mobile network 10. The different types of deployment models can vary based on the location of components of the packet core technology. In some implementations, at least three different deployment models can be made available: a cloud deployment model, a user-selected location deployment model, and a hybrid deployment model. In the cloud deployment model, the entire packet core (including the user plane and the control plane) can be hosted on the cloud computing system that provides the mobile connectivity service. In the user-selected location deployment model, the entire packet core can be deployed at one or more locations that are selected by the user. The user-selected locations can be, for example, an on-premises network, a colocation center, a peering location, an edge location of a public cloud provider (e.g., where content delivery network and other caching services are provided), an edge location of a telecommunication company, and combinations thereof. In the hybrid deployment model, some aspects of the packet core can be hosted on a cloud computing system that provides the mobile connectivity service, while other aspects of the packet core can be deployed at one or more user-selected locations.

The techniques disclosed herein are applicable to any type of private mobile network, including (but not limited to) mobile networks based on mobile cores, Long-Term Evolution (LTE) wireless communication standards, and/or other types of wireless communications standards, such as 5G standards, Universal Mobile Telecommunications System (UMTS) standards, and/or Global System for Mobile Communications (GSM) standards. The techniques disclosed herein are not limited to cellular networks but are also applicable to wireless networks that operate in accordance with other access technologies, such as wireless local area network (WLAN) technologies that operate in accordance with an IEEE 802.11 standard (e.g., 802.11ax, also known as "WiFi 6").

The cloud computing system 102 may include a mobile network service 104 that facilitates the creation and management of the private mobile networks 10. One or more users 106, also referred to as customers, may use the mobile network service 104 to create a new private mobile network 10 and/or manage an existing private mobile network 10. In addition, one or more SIM partners 108 may communicate with the mobile network service 104 to provide the SIM operation details 24 for SIM cards 20 of the devices that may access the private mobile networks 10. One or more packet core partners 110 may communicate with the mobile network service 104 to receive private network information 12 and the SIM operations details 24. As such, the mobile network service 104 may securely communicate with each of the users 106, the SIM partners 108, and/or the packet core partners 110 to facilitate the creation and deployment of private mobile networks 10.

The mobile network service 104 may establish an interface for securely communicating with the users 106. For example, the mobile network service 104 may provide a mobile network portal 12 (e.g., a website) through which the users 106 may create and manage one or more private mobile networks 10. Through the mobile network portal 12, the users 106 may select to create a new private mobile network 10 or manage an existing private mobile network 10. The users may select a SIM partner 108 from the plurality of SIM partners 108 associated with the cloud computing system 102 to provide SIMs cards 20 for use with the private mobile network 10. The users 106 may send a private network request 14 for the private mobile network 10 with the selected SIM partner 108.

The private network request 14 may include a request to create a new private mobile network 10. The private network request 14 may also include a request to manage an existing private mobile network 10 and/or a request to modify an existing private mobile network 10. In addition, the private network request 14 may include private network information 12 for the private mobile network 10. The private network information 12 may include, but is not limited to, the selected SIM partner 108, a selected packet core partner 110, a number of SIM cards 20 for use with the private mobile network 10, a network name, a public land mobile network (PLMN) to use (e.g., a PLMN of the user's choice or the PLMN provided by the SIM partner), one or more locations for the private mobile network 10, and/or user information (e.g., company name, representative name, contact information, address).

The mobile network service 104 may provide the users 106 flexibility in selecting a SIM partner 108 to supply the SIM cards 20 for use with the private mobile network 10 and to specifying a PLMN for use with the private mobile network 10. The mobile network service 104 may provide a PLMN IMSI Block Number (IBN) for Citizens Broadband Radio Service (CBRS) for those users 106 who do not have a PLMN. In addition, the mobile network service 104 may perform one or more conflict checks to ensure that the users 106 are not using PLMNs that belong to other users.

The mobile network service 104 may receive the private network request 14 and may generate a SIM service key 32 for the private mobile network 10. The SIM service key 32 may identify each private mobile network 10 in cloud computing system 102. In an implementation, the SIM service key 32 is a global unique identifier (GUID) that creates a unique identifier of the private mobile network 10. If the user 106 is creating a new private mobile network 10, a new SIM service key 32 is generated and provided to the user 106 for the private mobile network 10. If a customer is adding SIM cards 20 to an existing private mobile network 10 and/or removing SIM cards 20 from an existing private mobile network 10, the existing SIM service key 32 for the private mobile network 10 is provided to the user 106.

The user 106 may provide the SIM service key 32 to the selected SIM partner 108 when purchasing the requested number of SIM cards 20 from the SIM partner 108. The user 106 may complete the purchase of the SIM cards 20 with the SIM partner 108.

In an implementation, the mobile network service 104 may supply SIM cards 20 to the users 106. As such, the users 106 may directly purchase the SIM cards 20 from the mobile network service 104 for use with the private mobile network 10 instead of using a SIM partner 108.

The mobile network service 104 may have a SIM partner application programming interface (API) 16 that facilitates communications between a plurality of SIM partners 108 and the mobile network service 104. The SIM partner API 16 may include onboarding tools that enable onboarding the plurality of SIM partners 108 to the cloud computing system 102 for use with the private mobile networks 10. The SIM partners 108 may use the SIM partner API 16 to partner with the cloud computing system 102 to provide SIM cards 20 for use with the private mobile networks 10.

The SIM partner API 16 may also be used to establish secure communications between the SIM partners 108 and the mobile network service 104. Each SIM partner 108 may exchange a transport key 18 with the mobile network service 104 using the SIM partner API 16. The transport key 18 may be an encryption key that is used to encrypt data in transit over the SIM partner API 16. Each SIM partner 108 has a unique transport key 18. In an implementation, the transport key 18 may rotate or change periodically (e.g., every ninety days). The mobile network service 104 may securely store the transport keys 18 for each SIM partner 108 in a key vault 40 in a secure datastore 120. The SIM partner 108 and the mobile network service 104 may exchange the transport key 18 one time during the onboarding or initiation of the SIM partner 108 with the cloud computing system 102.

After the user 106 chooses the SIM partner 108 for the SIM cards 20 for use on the private mobile network 10, the SIM partner 108 may query the mobile network service 104 using the SIM partner API 16 for the private network information 12 for the private mobile network 10 associated with the SIM service key 32 provided by the user 106. The mobile network service 104 may send the private network information 12 to the SIM partner 108 using the SIM partner API 16. In an implementation, the mobile network service 104 provides a subset of the private network information 12 to the SIM partner 108 to ensure that the SIM partner 108 only has the relevant information for the private mobile network 10 while preventing the SIM partner 108 from accessing other confidential or private information of the user 106.

Each SIM card 20 may have a corresponding SIM profile 26. The SIM partner 108 generates the Ki values 28 for each private mobile network 10 of the purchased SIM cards 20. In addition, the SIM partner 108 generates the derived operator code (OPc) value 30 for each for each private mobile network 10 of the purchase SIM cards 20. The OPc value 30 is derived from the Ki values 28 and the operator code (OP) allocated to an operator and. For example, an encryption algorithm generates the OPc value 30 using the operator code (OP) and the Ki values 28. The operator code (OP) remains fixed for all SIM cards 20 of the operator. The SIM secrets for the SIM card 20 may include the operator code (OP), the OPc value 30, and the Ki values 28. Each SIM card 20 has a unique OPc value 30 to identify the SIM card 20. The SIM partners 108 may burn or otherwise identify each SIM card 20 with the corresponding OPc value 30 and Ki value 28. By having a different OPc value 30 and Ki value 28 for the private mobile network 10 (which is associated with the specific order of SIMs for the private mobile network 10), if one SIM card 20 is compromised, only that batch of SIM cards 20 in that order are compromised, reducing the impact to the private mobile network 10.

In an implementation, each SIM card 20 may have multiple SIM profiles 26, allowing the SIM card 20 to move between a private mobile network 10 and a public network. In addition, the multiple SIM profiles 26 may allow the SIM card 20 to move between different private mobile networks 10. As such, the users 106 may move the SIM cards 20 from the private mobile network 10 to another private mobile network or move the SIM cards 20 from the private mobile network 10 to a public network.

The SIM partner 108 may transmit SIM operations details 24 for the purchased SIM cards 20 to the mobile network service 104 using the SIM partner API 16. The SIM operations details 24 may include, but are not limited to, the international mobile subscriber identity (IMSI) values for the SIM cards 20, the integrated circuit card identifier (ICCID) values for the SIM cards 20, the Ki values 28 for each SIM profile 26, and/or the OPc value 30 for each SIM profile 26. The SIM partner 108 may encrypt the SIM operations details 24 using the transport key 18 to securely transmit the SIM operations details 24 to the mobile network service 104.

The mobile network service 104 decrypts the received SIM operations details 24 using the transport key 18. The mobile network service 104 may securely store the SIM operations details 24 for the private mobile network 10 in a secure datastore 120. The secure datastore 120 may include a key vault 40 for securely storing the transport keys 18, the SIM service keys 32, and/or the operator keys.

The mobile network service 104 may perform one or more conflict checks for the SIM operations details 24. For example, if the mobile network service 104 determines that the IMSI values for the SIM cards 20 overlap with other values already stored in the secure datastore 120, the mobile network service 104 sends a notification to the SIM partner 108 alerting the SIM partner 108 that those IMSI values are already in use. The mobile network service 104 may ensure that the IMSI range for the SIM cards 20 for the private mobile network 10 is not already used by a different private mobile network 10, and thus, overlapping of the IMSI ranges may be prevented.

In addition, the secure datastore 120 may include a user subscription 44 for each user 106 of the cloud computing system 102. The user subscription 44 may include one or more private mobile networks 10 associated with the user 106. The user subscription 44 may include the SIM profiles 26 for the SIM cards 20 of devices that may use the private mobile network 10 and the SIM operations details 24 associated with each of the SIM profiles 26. The user subscription 44 may also include the mobile core information 42 with details about the mobile cores 114, 118 for each of the private mobile networks 10. As such, the mobile network service 104 may store the information in the secure datastore 120 in a segmented fashion to prevent unauthorized access to the information. For example, the users 106 may only have access to information relating to their own private mobile networks 10 without having access to key information that is exchanged between the SIM partners 108 and the mobile network service 104. Moreover, the users 106 may be unable to access information about other users' private mobile networks.

The mobile network service 104 may have a packet core partner API 34 for communicating with one or more packet core partners 110. The packet core partner 110 may provide the access points for the private mobile network 10. For example, the packet core partner 110 may provide one or more Radio Access Network (RAN) base stations for accessing the private mobile network 10. In an LTE network, a base station is referred to as an Evolved Node B (which can be abbreviated as eNodeB or eNB). In a 5G network, a base station is referred to as gNodeB or 5G NB.

The mobile network service 104 may communicate the SIM operations details 24 for the SIM profiles 26 of the SIM cards 20 of devices that may use the private mobile network 10 to the packet core partner 110. In addition, the mobile network service 104 may communicate the private network information 12 for the private mobile network 10 to the packet core partner 110. The packet core partner 110 may store the SIM operations details 24 in a corresponding HSS pool 36 (for 4G LTE private networks) or store the SIM operations details 24 in a corresponding UDM pool 38 (for 5G private networks). As such, system 100 may be mobile network generation agnostic and compatible across different mobile network generations.

The packet core partner 110 may communicate with a number of edge devices 112, 116 for the private mobile network 10 based on the private network information 12 received from the mobile network service 104. The edge devices 112, 116 may be located at different geographic locations or mobile network sites. While two edge devices 112, 116 are depicted in the example, a private mobile network 10 in accordance with implementations may include any number of edge devices located at any number of geographic locations or mobile network sites.

The packet core partner may communicate with a mobile core 114, 118 at each edge device 112, 116 for running the private mobile network 10. The packet core partner may identify the SIM profiles 26 of the SIM cards 20 that may be used for the private mobile network 10 at the edge devices 112, 116. For example, the SIM cards 20 may move between the different edge devices 112, 116 and may access the private mobile network 10 from any of the edge devices 112, 116. Another example may include identifying specific SIM cards 20 for use at specific edge devices 112, 116 (e.g., a subset of the SIM cards 20 may only be used at the edge device 112, while a different subset of the SIM cards 20 may be used at the edge device 116).

Upon activation or deactivation of one or more devices on the private mobile networks 10, the packet core partner 110 may perform a verification or authentication of the devices by comparing the SIM profile 26 of each device trying to access the private mobile network 10 with the SIM operations details 24 stored in the HSS pool 36 or the UDM pool 38 for the private mobile network 10. By validating the information of the devices with the HSS pool 36 or the UDM pool 38, the packet core partner 110 may ensure that the devices belong to the private mobile network 10 and may prevent unauthorized devices from using the private mobile network 10.

As such, the mobile network service 104 provides a secure infrastructure using the SIM partner API 16 and the packet core API 34 for performing a SIM ceremony on demand for the purchased SIM cards 20. The mobile network service 104 securely communicates the relevant SIM information for the private mobile networks 10 among the SIM partners 108 and the packet core partners 110.

As such, system 100 may simplify the creation and management of private mobile networks 10. System 100 may easily scale to support additional SIM partners 108 and/or additional packet core partners 110 by providing a platform where SIM partners 108 and/or packet core partners 110 may easily integrate with cloud computing system 102 to provide services for private mobile networks 10.

System 100 also provides users 106 with a complete managed experience for selecting and deploying a new private mobile network 10. The mobile network service 104 may simplify the setup and management of mobile networks by providing the users 106 an end-to-end management and monitoring experience.

Figure 2:
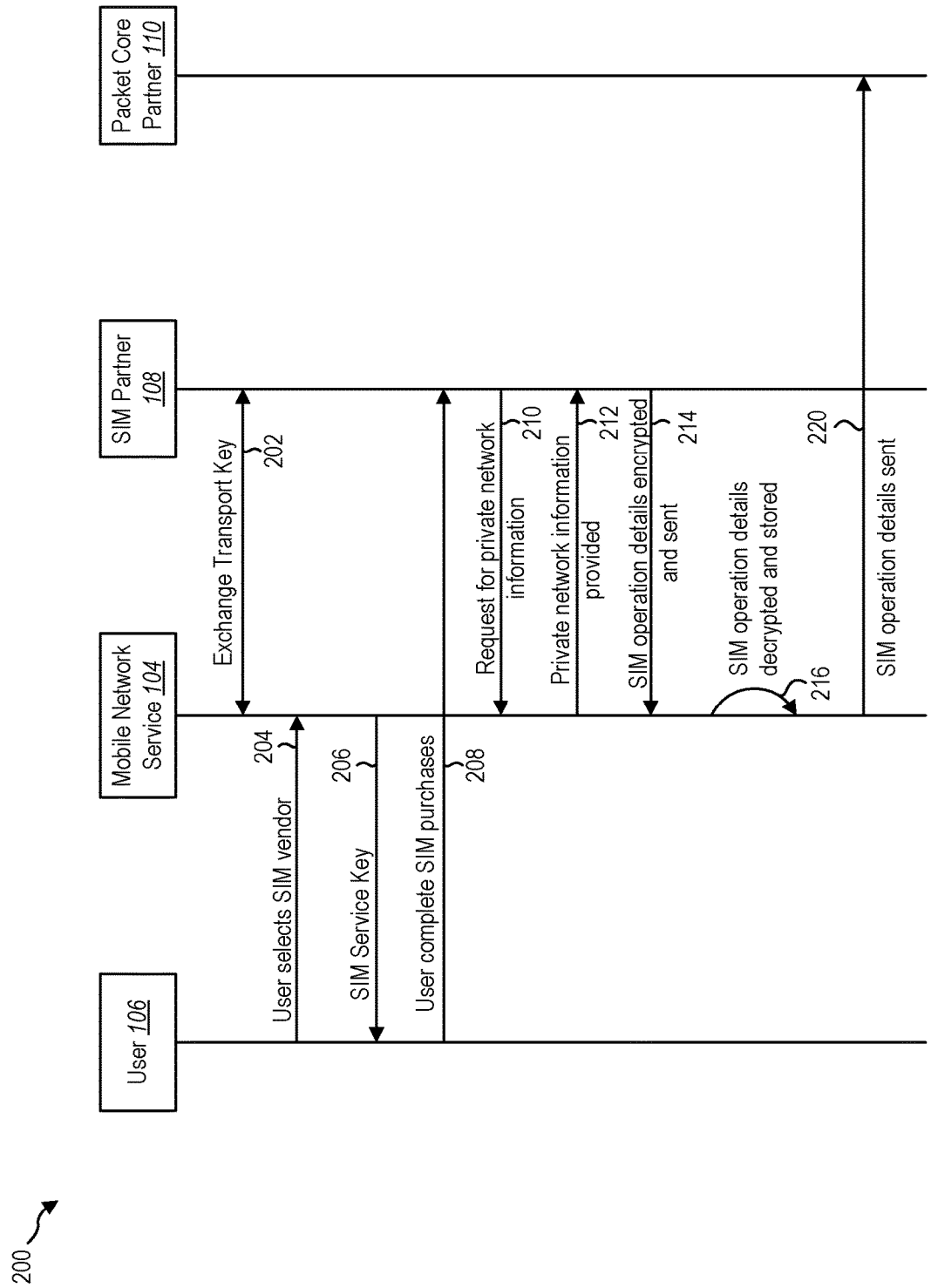
FIG. 2 illustrates an example method for SIM management for a private mobile network in accordance with implementations of the present disclosure.

Referring now to FIG. 2, illustrated is an example method 200 for SIM management for a private mobile network 10 (FIG. 1) implemented through a cloud computing system 102 (FIG. 1). Method 200 is used to have a SIM ceremony on demand so SIM cards 20 may be selected and authenticated for a private mobile network 10 upon receiving a request to create the private mobile network 10 and/or a request to add more SIM cards 20 to an existing private mobile network 10. Method 200 enables the SIM ceremony to occur in a trustworthy manner. The actions of method 200 may be discussed below with reference to the architecture of FIG. 1.

At 202, the mobile network service 104 and the SIM partner 108 exchange a transport key 18. The transport key 18 is used to encrypt data in transit between the mobile network service 104 and the SIM partner 108. The transport key 18 may be exchanged one-time and may be used to establish trust between the mobile network service 104 and the SIM partner 108.

At 204, a user 106 selects an option to use a SIM partner 108 for providing SIMs for a private mobile network 10. The SIM partner 108 may include a SIM provider, a SIM vendor, a telecom company, and/or a general system integrator (SI). The SIM partner 108 may provide new SIMs to the user 106 for the private mobile network 10. In addition, the SIM partner 108 may provide SIMs previously procured by the SIM partner 108 (e.g., for use by the user 106 or for other uses). The user 106 may create a new private mobile network 10 and select the SIM partner 108 to provide the SIM cards 20 for the new private mobile network 10. In addition, the user 106 may add SIM cards 20 to an existing private mobile network and select the SIM partner 108 for providing the additional SIM cards 20 for the private mobile network 10. For example, the user may want to add additional devices to one or more locations of the private mobile network 10. Another example may include the user adding a new location of the private mobile network 10 and adding additional devices to the new location.

The user may provide additional information to the SIM partner 108 for the new private mobile network 10. Additional information may include, but is not limited to, a quantity of SIM cards 20 for use with the private mobile network 10, the IMSI range for the SIM cards 20, a public landline mobile network (PLMN) ID, a network name for the private mobile network, and/or other customer information. As such, the user may select a variety of different information for the private mobile network 10 to provide to the SIM partner 108.

At 206, the mobile network service 104 provides the user 106 with a SIM service key 32 for the private mobile network 10. If the user 106 is creating a new private mobile network 10, a new SIM service key 32 may be generated by the mobile network service 104 and provided to the user 106. If a user 106 is adding the SIM cards 20 to an existing private mobile network 10, the existing SIM service key 32 may be provided to the user 106. In addition, if the user 106 is adding the SIM cards 20 to an existing private mobile network 10, a new SIM service key 32 may be generated and the mobile network service 104 may associate the new SIM service key 32 with the existing private mobile network 10.

At 208, the user 106 completes the purchase of the SIM cards 20 with the SIM partner 108. The user 106 provides the SIM service key 32 to the SIM partner 108 and coordinates with the SIM partner 108 the purchase of the SIM cards 20 for the private mobile network 10. The SIM cards 20 may include, dual SIMs, uSIMs, and/or eSIMs.

At 210, the SIM partner 108 sends a request to the mobile network service 104 for the private network information 12 associated with the SIM service key 32, and at 212, the mobile network service 104 provides the private network information 12 to the SIM partner 108. The private network information 12 may include the number of SIM cards 20 for the private mobile network 10, a selected PLMN, an IMSI range for the SIM cards 20, and a network name for the private mobile network 10.

At 214, the SIM partner 108 encrypts the SIM operation details 24 and sends the SIM operation details 24 to the mobile network service 104. The SIM partner 108 generates the Ki values 28 for each SIM profile 26 of the plurality of SIM cards 20 purchased by the user 106. The SIM partner 108 uses the Ki values 28 and the operator code (Op) to generate the unique OPc values 30 for each SIM profile 26. The SIM operation details 24 include the IMSI values, the ICCID values, the Ki values 28, and the OPc values 30 for the SIM cards 20 purchased by the user 106 for the private mobile network 10. The SIM partner 108 encrypts the SIM operation details 24 using the SIM service key 32 and sends the SIM operation details 24 to the mobile network service 104 using the SIM partner API 16.

At 216, the mobile network service 104 decrypts the SIM operation details 24 and stores the SIM operation details 24. The mobile network service 104 decrypts the SIM operation details 24 using the transport key 18. The SIM operations details 24 may include, but are not limited to, the IMSI values for the SIM cards 20, the ICCID values for the SIM cards 20, the Ki values 28 for each SIM profile 26, and/or the OPc value 30 for each SIM profile 26. The mobile network service 104 may re-encrypt the SIM operation details 24 prior to storing the SIM operation details 24, and thus, ensures that the SIM operation details 24 is encrypted data-at-rest. As such, the SIM operation details 24 are securely stored in a secure datastore 120.

At 220, the mobile network service 104 sends the SIM operation details 24 to the packet core partner 110. In some implementations, the packet core partner 110 is an internal service provided by the mobile network service 104. As such, the mobile network service 104 and the packet core partner 110 may be the same entity. In some implementations, the packet core partner 110 is an external partner with the mobile network service 104. For example, the packet core partner 110 is an Evolved Packet Core (EPC) partner. The mobile network service 104 may populate the HSS pool 36 or the UDM pool 38 at the packet core partner 110 with the SIM operation details 24 for further use. Upon activation or deactivation of one or more devices on the private mobile network 10, the packet core partner 110 may verify the SIM cards 20 of the devices trying to access the private mobile network 10, with the information stored in the HSS pool 36 or the UDM pool 38.

As such, method 200 may be used to integrate a plurality of SIM partners 108 with the cloud computing system 102 and manage the SIM information for one or more private networks 10.

Figure 3:
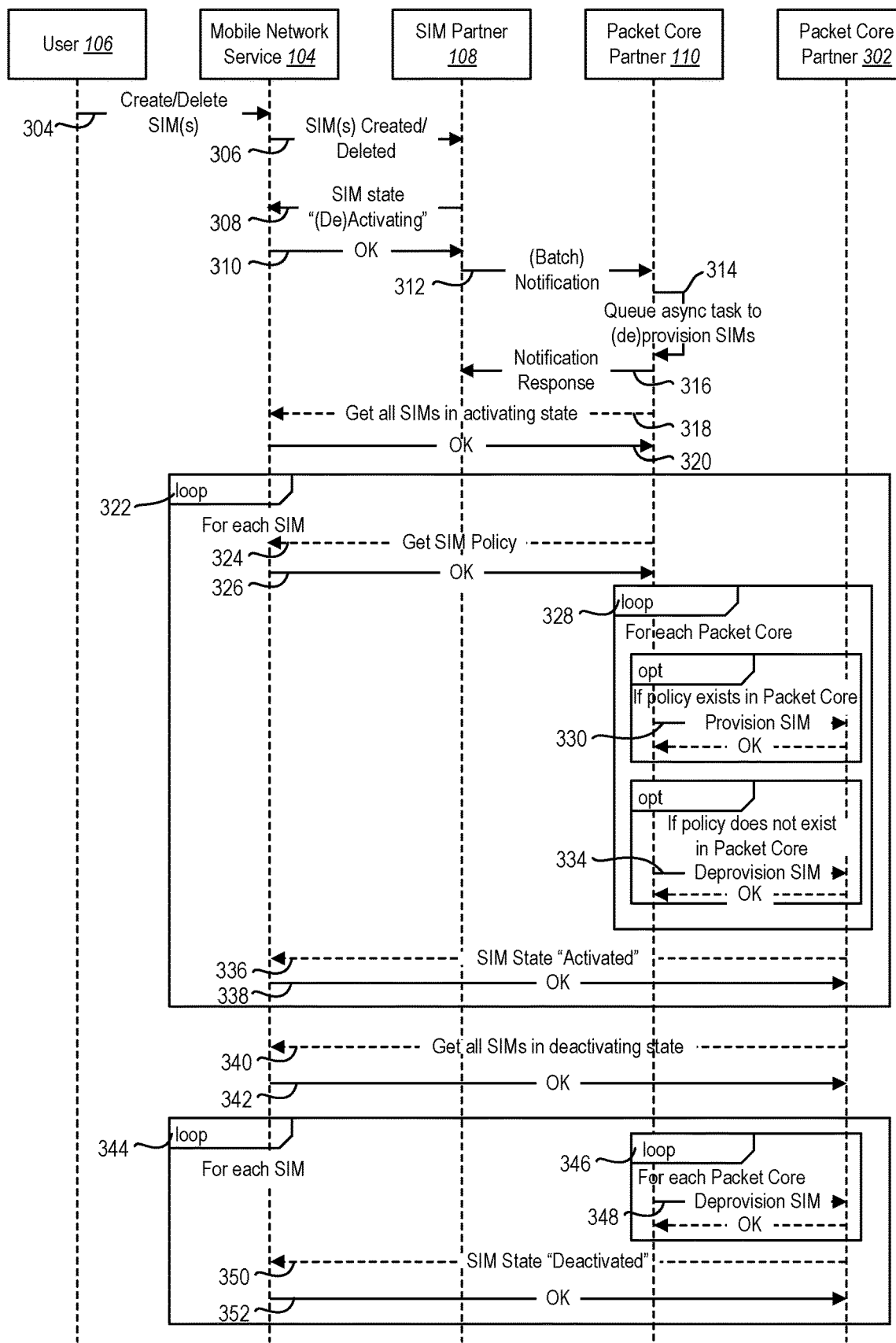
FIG. 3 illustrates an example method for configuring SIM policies in accordance with implementations of the present disclosure.

Referring now to FIG. 3, illustrated is an example method 300 for configuring SIM policies for a private mobile network 10 (FIG. 1) implemented through a cloud computing system 102 (FIG. 1). The SIM polices may indicate when to activate a SIM card 20 (FIG. 1) or a SIM profile 26 (FIG. 1) associated with the SIM card 20 on an edge device (e.g., edge device 112, 116) of the private mobile network 10. In addition, the SIM policies may indicate when to deactivate the SIM card 20 or the SIM profile 26 on the private mobile network 10. The SIM policies may also indicate when to prevent the SIM card 20 or the SIM profile 26 from accessing the private mobile network 10. The SIM polices may be part of the SIM operation details 24 (FIG. 1).

Each SIM card 20 and/or SIM profile 26 may have a SIM policy. Different SIM profiles 26 may have the same SIM policy. In addition, different SIM profiles 26 may have different SIM policies. The SIM policy may describe the performance characteristics that a SIM card 20 or the SIM profile 26 may have on the private mobile network 10. The user 106 may manage a lifecycle of the SIM card 20 or SIM profile 26 by configuring the SIM policies assigned to the SIM card 20 or SIM profile 26. The SIM policies may add sophistication to the SIM cards 20 or SIM profiles 26 by configuring the activation and/or deactivation of the SIM cards 20 or SIM profiles 26 on the private mobile network 10.

An example SIM policy includes timebound access to the private mobile network 10. For example, the SIM profiles 26 associated with the timebound SIM policy may only access the private mobile network 10 during the morning hours. As such, the SIM profiles 26 are part of the private mobile network 10 but the SIM policies limit the access the SIM profiles 26 have to the private mobile network 10. Another example SIM policy includes all SIM profiles 26 that belong to IP cameras are provided with a specified bandwidth on the private mobile network 10. Another example SIM policy includes SIM profiles 26 with a high quality of service requirement may bump SIM profiles 26 from the private mobile network 10 with a lower quality of service requirement as compared to the high quality of service requirement. The actions of method 300 may be discussed below with reference to the architecture of FIG. 1 for activating and/or deactivating SIM cards 20 from having access to the private mobile network 10 through the edge devices on the private mobile network 10.

At 304, the user 106 sends a create and/or delete SIM message to the mobile network service 104, and at 306, the mobile network service 104 sends the create and/or delete SIM message to the SIM provider 108. The message may create one or more SIMs for use with one or more edge devices on the private mobile network 10 (as in FIG. 1) or may delete one or more SIMs from using one or more edge devices on the private mobile network 10.

At 308, the SIM provider 108 sends a SIM state activating and/or deactivating message to the mobile network service 104. The SIM provider 108 may activate the SIM state if the message sent is for creating SIMs and the SIM provider 108 may deactivate the SIM state if the message sent is for deleting SIMs. At 310, the mobile network service 104 sends an acknowledgement message to the SIM partner 108.

At 312, the SIM partner 108 sends a notification to the packet core partner 110 to provision the SIMs and/or deprovision the SIMs based on the SIM state. The packet core partner 110 may be an internal service to the cloud service provider or may be a third party packet core partner 110. The notification to the packet core partner 110 may be a batch notification for a plurality of SIMs. The notification may identify which SIM cards 20 to provision or deprovision from the edge devices on the private mobile network.

At 314, the packet core partner 110 may provision and/or deprovision the SIM cards 20 identified in the notification. At 316, the packet core partner 100 may send a notification response to the SIM partner 108 indicating that the SIM cards 20 are provisioned and/or deprovisioned.

At 318, the packet core partner 110 may send a message to the mobile network service 108 identifying the SIM cards 20 in an active state at the packet core partner 110. At 320, the mobile network service 108 may send an acknowledgement message to the packet core partner 110 acknowledging receipt of the active state information. At 322, a loop may be performed for each SIM card 20 with an active state. At 324, the packet core partner 110 may send the SIM policy to the mobile network service 104. At 326, the mobile network service 104 may send an acknowledgement to the packet core partner 110 acknowledging the receipt of the SIM policies for the SIM card 20.

At 328, a loop may be performed for each packet core of the edge devices (e.g., edge devices 112, 116) of the private mobile network 10. At 330, if a SIM policy exists for the SIM profile 26 associated with the SIM card 20 in the packet core of the edge devices, the packet core partner 110 provisions the SIM card 20 in the packet core 302. As such, the SIM card 20 may access the private mobile network 10 at the edge device. At 334, if a SIM policy does not exist for the SIM profile 26 in the packet core of the edge devices, the packet core partner 110 deprovisions the SIM card 20 from the packet core. As such, the SIM card 20 may be unable to access the private mobile network 10 at the edge device. The loop 328 continues for all packet cores on the edge devices.

At 336, the packet core 302 may send a SIM state activation message to the mobile network service 104 indicating whether the SIM card 20 is active on the packet core 302 or deactivated on the packet core 302, and at 338, the mobile network service 104 may send an acknowledgement message to the packet core 302. The loop 322 may continue for each SIM card 20 in the active state.

At 340, the packet core partner 110 may send a message to the mobile network service 108 identifying the SIM cards 20 in a deactivated state at the packet core partner 110. At 342, the mobile network service 108 may send an acknowledgement message to the packet core partner 110 acknowledging receipt of the deactivation information.

At 344, a loop may be performed for each SIM card 20 with a de-active state. At 346, a loop may be performed by the packet core partner 110 for each packet core of the edge devices of the private mobile network 10. At 348, the packet core partner 110 sends a deprovisioning message that deprovisions the SIM card 20 from the packet core 302 for the edge device. The loop may continue for all edge devices on the private mobile network 10.

At 350, the packet core 302 may send a SIM state deactivation message to the mobile network service 104 for the deactivated SIM card 20. At 352, the mobile network service 104 may send an acknowledgement message to the packet core 302 indicating receipt of the SIM state deactivation information. The loop may continue for each SIM card in a de-active state at the packet core partner 110.

As such, the method 300 may be used to configure the capabilities of the SIM profiles 26 on the private mobile network 10 using different SIM policies.

Figure 4:
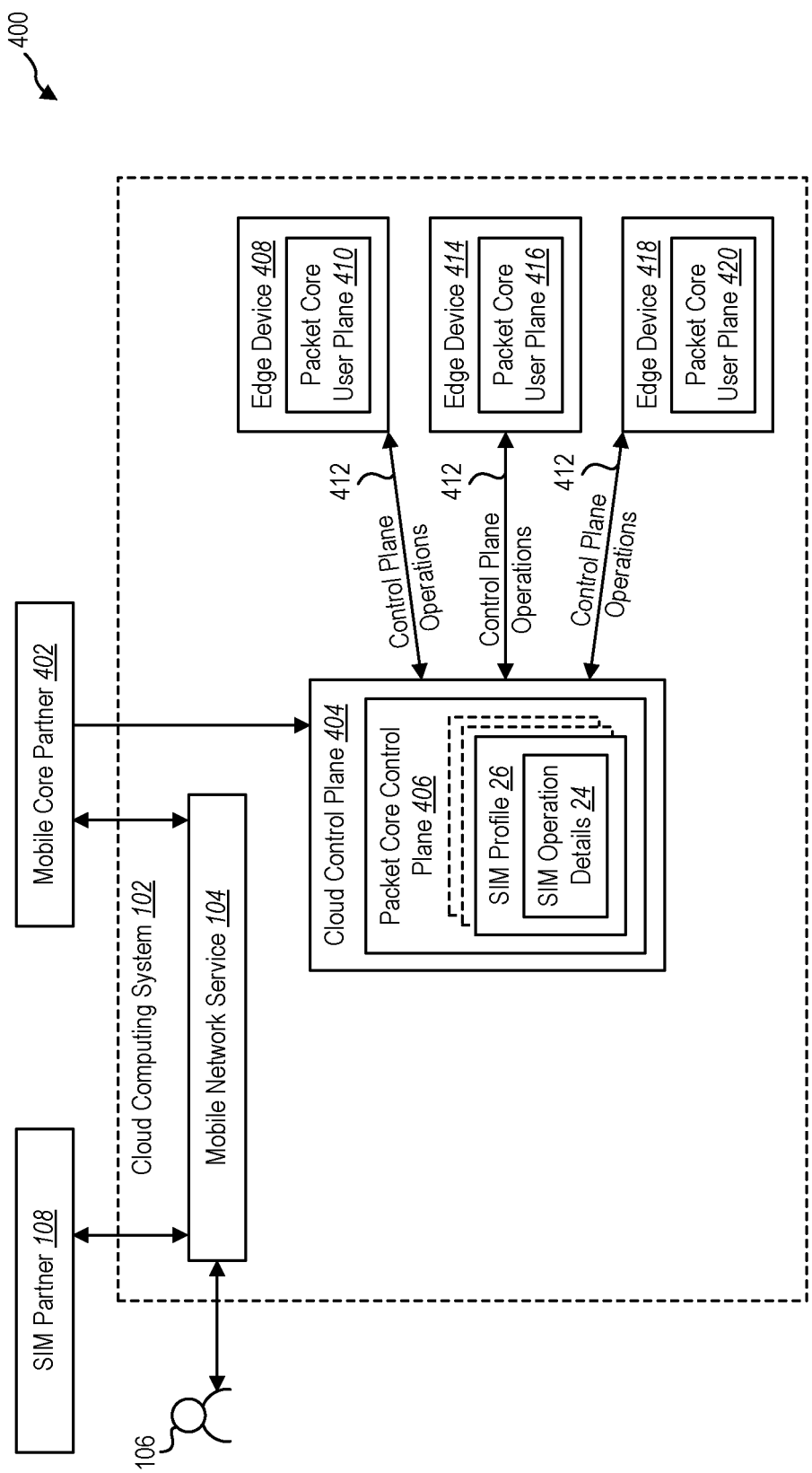
FIG. 4 illustrates an example system for providing a private mobile network using a cloud computing system in accordance with implementations of the present disclosure.

Referring now to FIG. 4, illustrated is an example system 400 for providing private mobile networks 10 (FIG. 1) implemented through a cloud computing system 102 (which may be a public cloud computing system) on one or more edge devices 408, 414, 418. The edge devices 408, 414, 418 may be at different mobile network sites.

System 400 may include one or more users 106 and one or more SIM partners 108 in communication with the mobile network service 104, as discussed above in FIG. 1. System 400 may also include one or more mobile core partners 402 (e.g., a mobile core vendor) in communication with the mobile network service 104. In some implementations, the mobile core partner 402 is an internal service or a first party service provided by the cloud computing system 102. The mobile network service 104 may communicate with the mobile core partners 402 through a secure interface, such as, a mobile core partner API. The mobile network service 104 may mange the SIM cards 20 (FIG. 1) and the SIM profile 26 (FIG. 1) information for the private mobile network 10 as discussed above in FIGS. 1 and 2.

The mobile network service 104 may transmit the SIM operation details 24 to the mobile core partner 402 using the mobile core partner API. The mobile core partner 402 may transmit the SIM operation details 24 for the SIM cards 20 of devices accessing the private mobile network 10 to a cloud control plane 404. The cloud control plane 404 may include a packet core control plane 406 for the private mobile network 10. The packet core control plane 406 may allocate computing resources within the cloud computing system 102 for running the private mobile network 10.

The cloud control plane 404 may communicate with one or more edge devices 408, 414, 418 for use with the private mobile network 10. Each edge device 408, 414, 418 may have a respective packet core user plane 410, 416, 420. The packet core user planes 410, 416, 420 may take a reference of the subscriber management network functions in the packet core control plane 406 in the cloud so that each edge device 408, 414, 418 maintains an updated view of the SIM profiles 26 able to access the private mobile network 10 using the edge devices 408, 414, 418. In some implementations, the packet core user plane 410, 416, 420 is implemented in the cloud control plane 404 separate from the edge devices 408, 414, 418. By keeping the information about which SIM profiles 26 may access the private mobile network 10 updated across the edge devices 408, 414, 418, mobility between different edge device 408, 414, 418 may be achieved since each edge device 408, 414, 418 understands which SIM profiles 26 may access the private mobile network 10.

The edge devices 408, 414, 418 may be located at different geographic locations or mobile network sites. The edge devices 408, 414, 418 may also be located at the same geographic location or mobile network site. While three edge devices 408, 414, 418 are depicted in the example, a private mobile network 10 in accordance with implementations may include any different number of edge devices located at any number of geographic locations or mobile network sites. The cloud control plane 404 may provide the control plane operations 412 to each of the edge devices 408, 414, 418 for the private mobile network 10.

As such, system 400 may be used to provide private mobile networks 10 implemented through a cloud computing system 102 where both the cloud control plane 404 and the packet core control plane 406 are implemented in the cloud.

Figure 5:
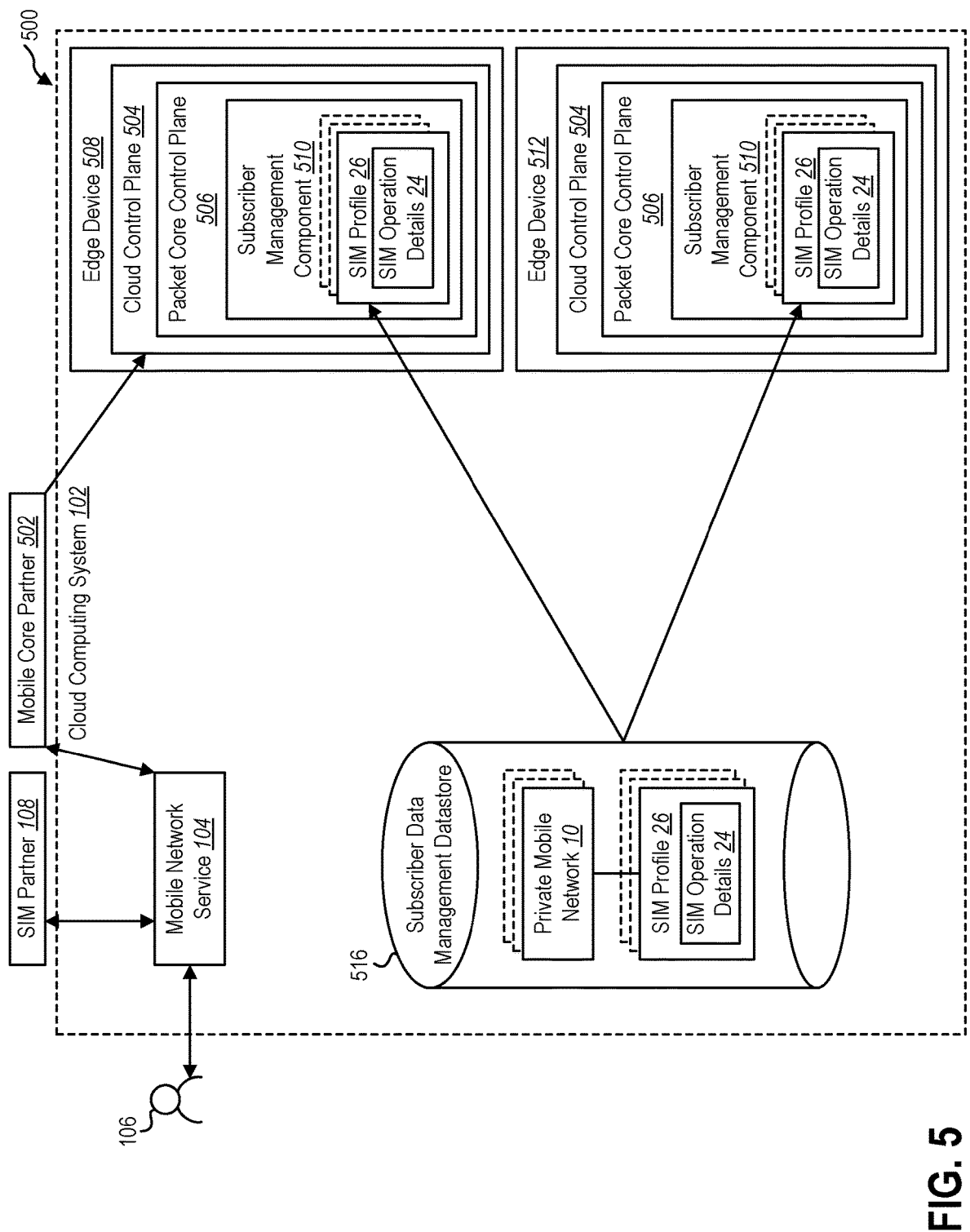
FIG. 5 illustrates an example system for providing a private mobile network using a cloud computing system with the cloud control plane and the packet control plane on the edge devices in accordance with implementations of the present disclosure.

Referring now to FIG. 5, illustrated is an example system 500 for providing a private mobile network 10 (FIG. 1) implemented through a cloud computing system 102 on one or more edge devices 508, 512. The edge devices 508, 512 may be at the same geographic location. In addition, the edge devices 508, 512 may be at different geographic locations. System 500 may include one or more users 106 and one or more SIM partners 108 in communication with the mobile network service 104, as discussed above in FIG. 1. System 500 may also include one or more mobile core partners 502 (e.g., a mobile core vendor) in communication with the mobile network service 104. In some implementations, the mobile core partner 502 is an internal service provided by the cloud computing system 102. For example, the mobile network service 104 and the mobile core partner 502 may be the same entity. The mobile network service 104 may communicate with the mobile core partners 502 through a secure interface, such as, a mobile core partner API. The mobile network service 104 may mange the SIM cards 20 (FIG. 1) and the SIM profile 26 (FIG. 1) information for the private mobile network 10 as discussed above in FIGS. 1 and 2.

The cloud control plane 504 may include a packet core control plane 506 for the private mobile network 10. The packet core control plane 506 may allocate computing resources within the cloud computing system 102 for running the private mobile network 10. The cloud control plane 504 and the packet control plane 506 are implemented on each of the edge devices 508, 512. By implementing the cloud control plane 504 and the packet core control plane 506 on the edge devices 508, 512 greater flexibility may be achieved in implementing the private mobile network 10. In addition, mobility of the edge devices 508, 512 between different locations that support the private mobile network 10 may be achieved.

The cloud computing system 102 may include one or more subscriber data management datastores 516. The subscriber data management datastores 516 may be a central datastore that stores the SIM profiles 26 and the SIM operation details 24 for each of the different private mobile networks 10.

The packet core control plane 506 includes a subscriber management component 510 that includes the SIM profiles 26 and the SIM operation details 24 of the SIM cards 20 provisioned to operate on the private mobile network 10. Each of the subscriber management components 510 may receive the SIM profiles 26 and the SIM operation details 24 for the SIM cards 20 of devices accessing the private mobile network 10 from the subscriber data management datastore 516. In some implementations, each of the subscriber management components 510 receive the same copy of the SIM profiles 26 and the SIM operation details 24 from the subscriber data management datastore 516. As such, each of the subscriber management components 510 in the different edge devices 508, 512 maintains the same view of the SIM cards 20 that may access the private mobile network 10 using the edge devices 508, 512.

By synching the subscriber management components 510 in the different edge devices 508, 512 seamless mobility of the edge devices 508, 512 between different geographic locations that use the same private mobile network 10 may be achieved. For example, the edge device 508 may use the subscriber management components 510 to move between different factories that use the same private mobile network 10. The subscriber management component 510 may identify the SIM profile 26 for the edge device 508 with the private mobile network 10 and may automatically access the private mobile network 10 at each factory location using the subscriber management component 510.

Moreover, by synching the subscriber management components 510 in the different edge devices 508, 512 seamless mobility of the edge devices 508, 512 between the private mobile network 10 and one or more public networks may occur. For example, the edge devices 508, 512 may use the subscriber management component 510 to identify the SIM profiles 26 of the edge devices 508, 512 with the private mobile network 10 at a first location (e.g., a warehouse). When the edge devices 508, 512 move locations, the edge devices 508, 512 may handover to a public network if the private mobile network 10 is no longer available (e.g., the edge devices 508, 512 are outside the range of the private mobile network 10). When the edge devices 508, 512 move back into a range of the private mobile network 10 (e.g., move back to the first location or move to a new location that implements the private mobile network 10), the edge devices 508, 512 may use the subscriber management component 510 to identify the SIM profiles 26 of the edge devices 508, 512 with the private mobile network 10 and may automatically connect to the private mobile network 10.

While two edge devices 508, 512 are depicted in the example, a private mobile network 10 in accordance with implementations may include any different number of edge devices located at any number of geographic locations or mobile network sites. As such, the system 500 may be used to provide flexibility in managing the edge devices 508, 512 to ensure that the edge devices 508, 512 have access to the private mobile network 10 when the edge devices 508, 512 are within the vicinity of the private mobile network 10.

Figure 6:
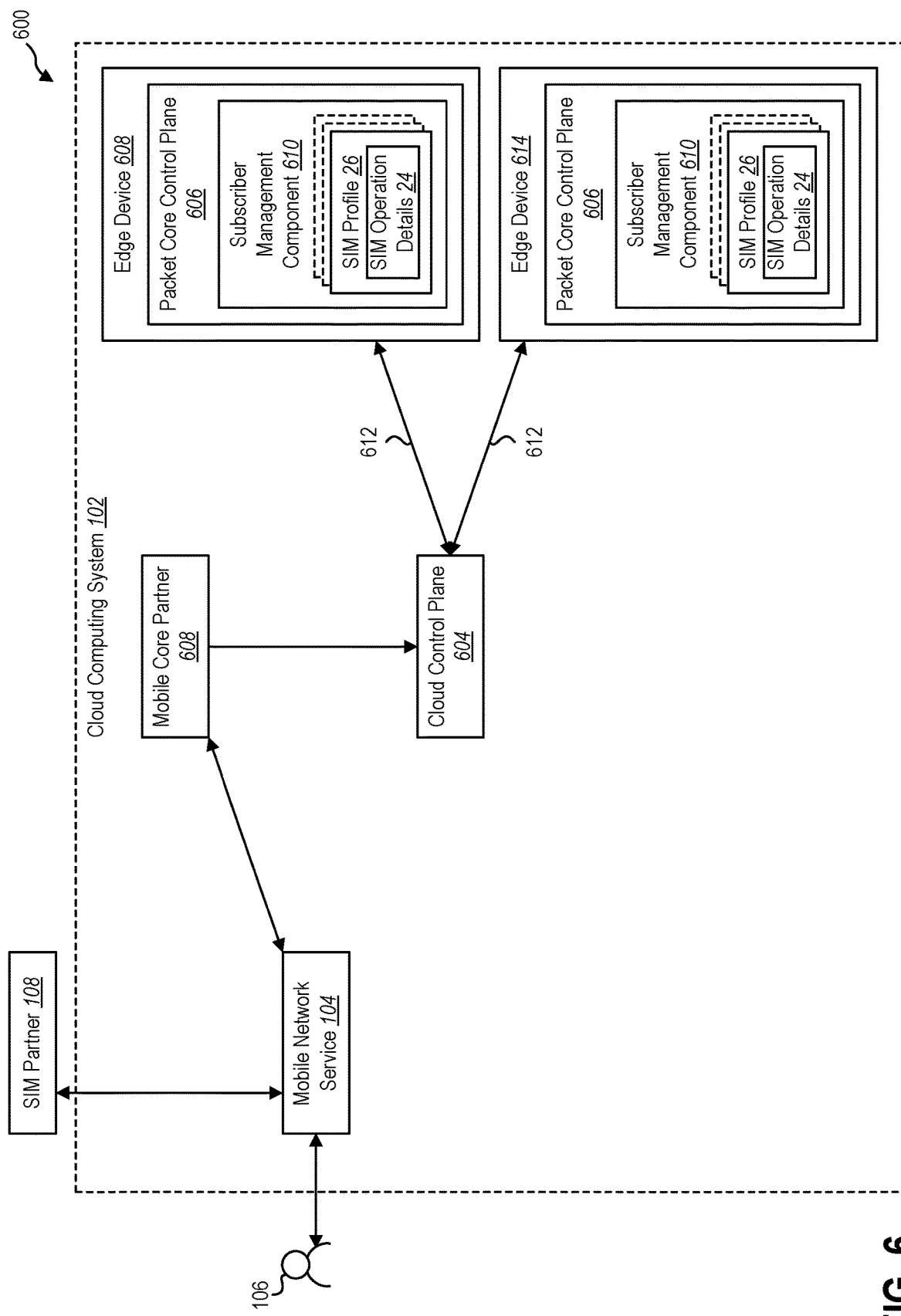
FIG. 6 illustrates an example system for providing a private mobile network using a cloud computing system with the cloud control plane in the cloud and the packet control plane on the edge devices in accordance with implementations of the present disclosure.

Referring now to FIG. 6, illustrated is an example system 600 for providing private mobile networks 10 (FIG. 1) implemented through a cloud computing system 102 (which may be a public cloud computing system) on one or more edge devices 608, 614. The edge devices 608, 614 may be at different geographic locations or mobile network sites. In addition, the edge devices 608, 614 may be at the same geographic locations or mobile network sites. While two edge devices 608, 614 are illustrated in the system 600, any number of edge devices 608, 614 may be implemented in the system 600.

The system 600 may include one or more users 106 and one or more SIM partners 108 in communication with the mobile network service 104, as discussed above in FIG. 1. The system 600 may also include one or more mobile core partners 602 (e.g., a mobile core vendor) in communication with the mobile network service 104. In some implementations, the mobile core partner 602 is an internal or a first party service provided by the cloud computing system 102. The mobile network service 104 may communicate with the mobile core partners 602 through a secure interface, such as, a mobile core partner API. The mobile network service 104 may mange the SIM cards 20 (FIG. 1) and the SIM profile 26 (FIG. 1) information for the private mobile network 10 as discussed above in FIGS. 1 and 2.

The mobile network service 104 may transmit the SIM operation details 24 to the mobile core partner 602 using the mobile core partner API. The mobile core partner 602 may transmit the SIM operation details 24 for the SIM cards 20 of devices accessing the private mobile network 10 to a cloud control plane 604.

The packet core control plane 606 may allocate computing resources within the cloud computing system 102 for running the private mobile network 10. The cloud control plane 604 may communicate with one or more edge devices 608, 614 for use with the private mobile network 10 using control plane operations 612.

Each edge device 608, 614 may have a packet core control plane 606. The packet core control plane 606 includes a subscriber management component 610 that includes the SIM profiles 26 and the SIM operation details 24 of the SIM cards 20 provisioned to operate on the private mobile network 10. Each of the subscriber management components 610 may receive the SIM profiles 26 and the SIM operation details 24 for the SIM cards 20 of devices allowed to access the private mobile network 10 from the cloud control plane 604. Each of the subscriber management components 610 receive the same copy of the SIM profiles 26 and the SIM operation details 24 from the cloud control plane 604 using the control plane operations 612. As such, each of the subscriber management components 610 in the different edge devices 608, 614 maintains the same reference of the SIM cards 20 that may access the private mobile network 10.

By replicating the subscriber management components 610 in the different edge devices 608, 614 from a central location in the cloud, seamless mobility of the edge devices 608, 614 between different geographic locations that use the same private mobile network 10 may be achieved. In addition, movement between the private mobile network 10 and public networks may be achieved by replicating the subscriber management components 610 in the different edge devices 608, 614 from a central location in the cloud.

Figure 7:
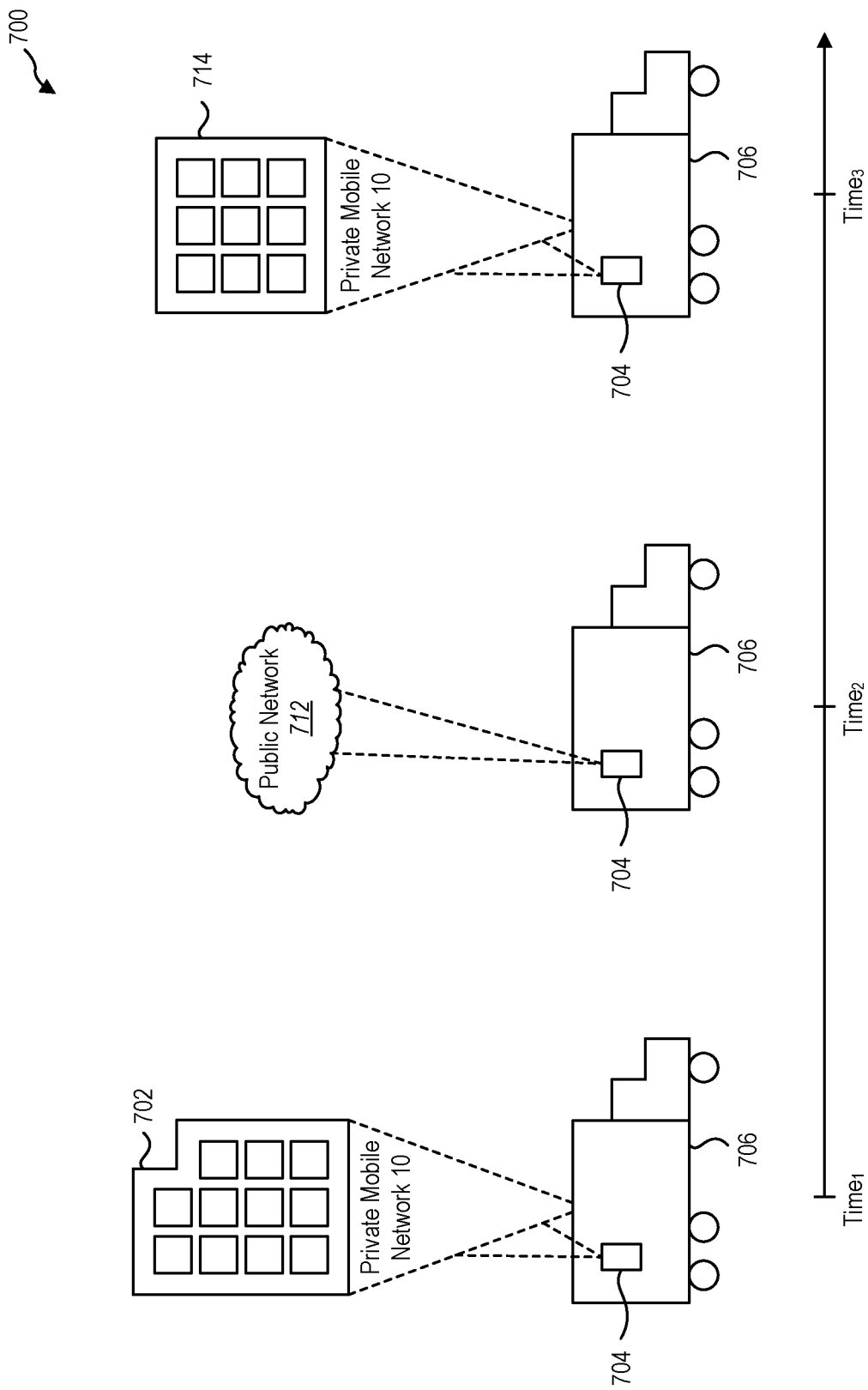
FIG. 7 illustrates an example environment for an edge device switching between a private mobile network and a public network in accordance with implementations of the present disclosure.

Referring now to FIG. 7, illustrated is an example environment 700 for switching an edge device 704 between a private mobile network 10 and a public network 712. The environment 700 may include two locations (e.g., building 702 and building 714) where the private mobile network 10 is deployed. For example, the buildings 702 and 714 may be warehouses for a company and both warehouses use the same private mobile network 10. In another example, the buildings 702 and 714 are different stores for an organization and the different stores use the same private mobile network 10.

The buildings 702 and 714 may be located at different locations in different geographic areas. The building 702 is located at a first geographic area and the building 714 is located at a second geographic area. At a first time (e.g., Time$_1$), the edge device 704 is located at the building 702. The edge device 704 may be connected to a vehicle 706. For example, the edge device 704 may be a temperature sensor tracking a temperature of food transported by the vehicle 706 from the building 702 to the building 714. The edge device 704 may be within the area covered by the private mobile network 10 and may identify with the private mobile network 10 and may connect to the private mobile network 10.

In some implementations, the edge device 704 uses a subscriber management component (e.g., subscriber management component 510, 610) on the edge device 704 for identifying the edge device 704 with the private mobile network 10 and connecting to the private mobile network 10. In some implementations, the edge device 704 uses a view of the SIM profile 26 information and SIM operation details 24 on the edge device 704 from the cloud (e.g., packet core plane 410) for identifying with the private mobile network 10 and connecting to the private mobile network 10.

At a second time (e.g., Time$_2$), the edge device 704 may be located outside of the range of the private mobile network 10. For example, the vehicle 706 is no longer nearby the building 702 and is moving towards the building 714. At the second time, the edge device 704 may handover to the public network 712. The public network 712 may be any network that the edge device 704 may be able to access.

At a third time (e.g., Time$_3$), the edge device 704 may be located nearby the range of the private mobile network 10 at the building 714. The edge device 704 may automatically identify with the private mobile network 10 inside the range of the private mobile network 10 and may handover from the public network 712 to the private mobile network 10.

The edge device 704 may move seamlessly between the private mobile network 10 and the public networks 712 as the edge device 704 changes locations. Moreover, the edge device 704 may connect to the same private mobile network 10 at another distinct location in a different geographic area. As such, the edge device 704 may connect to the same private mobile network 10 through multiple locations.

Figure 8:
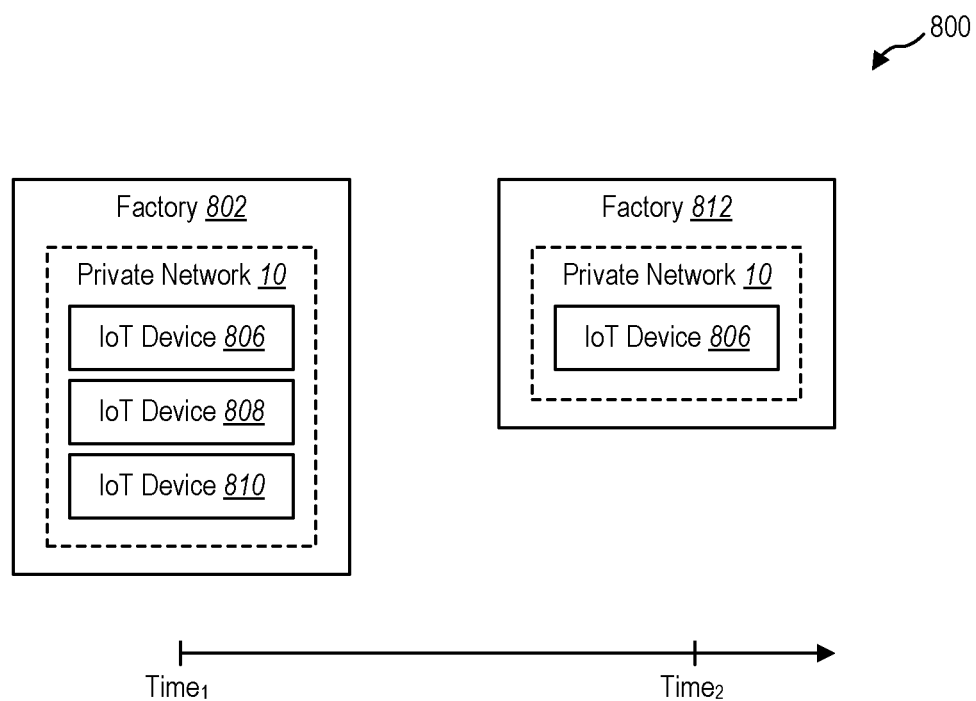
FIG. 8 illustrates an example environment accessing a private mobile network from multiple locations in accordance with implementations of the present disclosure.

Referring now to FIG. 8, illustrated is an example environment 800 for accessing a private mobile network 10 from multiple locations (e.g., Factory 802, Factory 812). The factories 802, 812 may be located at different locations in different geographic areas. For example, the factory 802 is in Seattle and the factory 812 is in Chicago. At a first time (e.g., Time$_1$), IoT devices 806, 808, 810 are located at the factory 802. The IoT devices 806, 808, 810 may be sensors used in the factory 802. The IoT devices 806, 808, 810 may be connected to the private mobile network 10 that is deployed within the factory 802.

At a second time, (e.g., Time$_2$), the IoT device 806 moves to the factory 812. For example, the sensor may be repurposed for work in the factory 812. Upon arrival at the new location (e.g., the factory 812), the IoT device 806 may identify with the same private mobile network 10 used at the factory 1 802 and connect with the private mobile network 10 at the factory 812. In some implementations, the IoT device 806 uses a subscriber management component (e.g., subscriber management component 510, 610) on the IoT device 806 for identifying the IoT device 806 with the private mobile network 10 and connecting to the private mobile network 10. In some implementations, the IoT device 806 uses a replica of the SIM profile 26 information and SIM operation details 24 on the IoT device 806 from the cloud for identifying with the private mobile network 10 and connecting to the private mobile network 10.

As such, the IoT device 806 connects to the same private mobile network 10 as the IoT device 806 moves between different locations (e.g., the factory 802, the factory 812).

Figure 9:
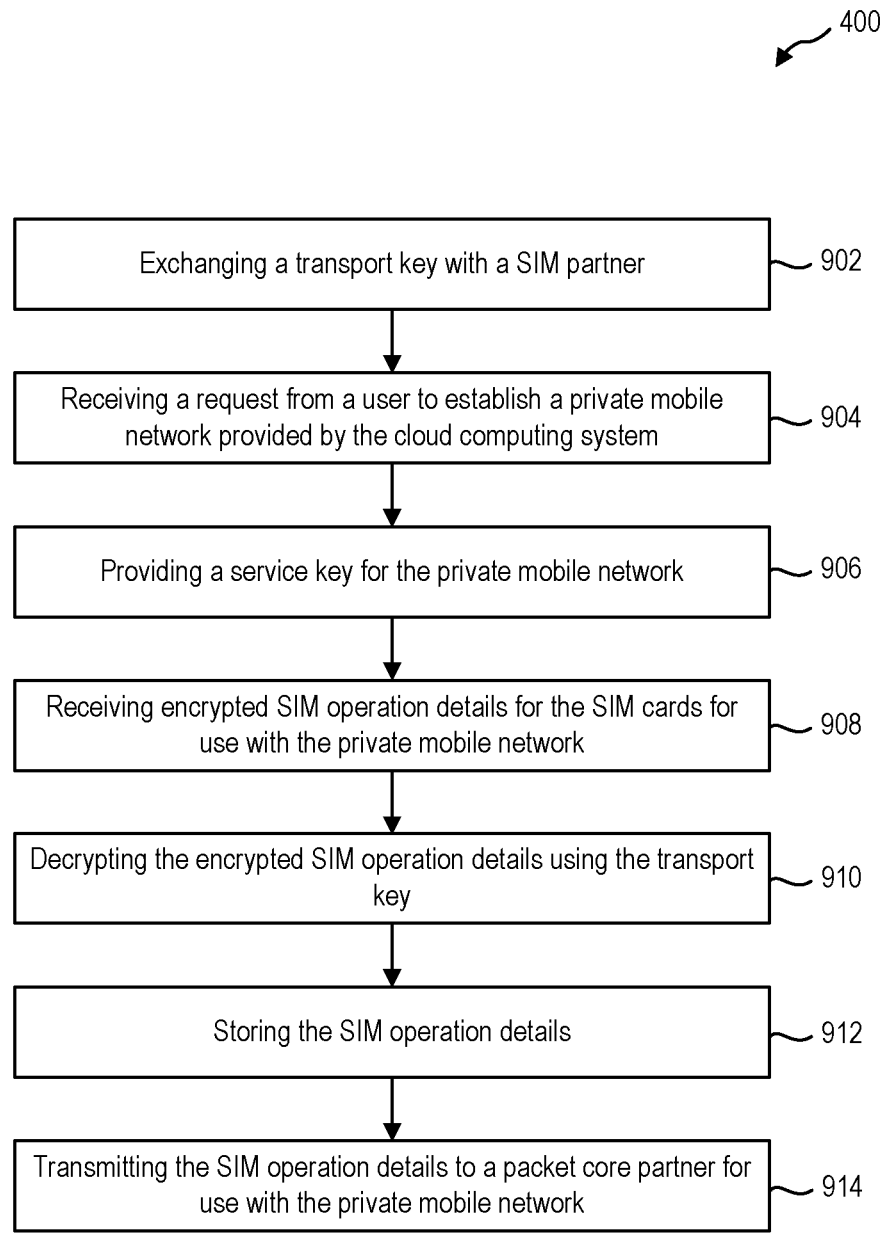
FIG. 9 illustrates an example method for SIM management for a private mobile network using a private mobile network service on a cloud computing system in accordance with implementations of the present disclosure.

Referring now to FIG. 9, illustrated is an example method 900 for SIM management for a private mobile network 10 (FIG. 1) using a private mobile network service 104 (FIG. 1) on a cloud computing system 102 (FIG. 1). The actions of method 900 may be discussed below with reference to the architecture of FIG. 1.

Method 900 may include generating Ki and OPc values in the private mobile network service substituting the SIM ceremonies for each users' private mobile networks. The SIM partner 108 may generate the Ki values 28 for each private mobile network 10 of the purchased SIM cards 20. In addition, the SIM partner 108 may also generate the operator code (OPc) value 30 using the Ki values 28 and the operator code (OP) for each private mobile network 10 of the purchase SIM cards 20. The operator code (OP) is allocated to an operator and the value remains fixed for all SIM cards 20 of the operator. The OPc value 30 is derived using a combination of the operator code (OP) and the Ki values 28. As such, each SIM card 20 has a unique OPc value 30 to identify the SIM card 20. The SIM partners 108 may burn or otherwise identify each SIM card 20 with the corresponding OPc value 30 and Ki value 28. By having a different OPc value 31 and Ki value 28 for the private mobile network 10, if one SIM card 20 is compromised, only that batch of SIM cards 20 in that order are compromised, reducing the impact to the private mobile network 10.

Method 900 may also include exchanging the Ki and OPc values with a SIM partner through APIs, where the Ki and OPc values may be programmed during manufacturing SIM cards.

At 902, method 900 may include exchanging a transport key with a SIM partner. The mobile network service 104 may exchange a transport key 18 with each SIM partner 108 associated with the cloud computing system 102 using a SIM partner API 16. The transport key 18 may be an encryption key that is used to encrypt data in transit over the SIM partner API 16. As such, the transport key 18 may be used to securely exchange the SIM secret values with the SIM partner 108. Each SIM partner 108 has a unique transport key 18. In an implementation, the transport key 18 may rotate or change periodically (e.g., every ninety days). The mobile network service 104 may securely store the transport keys 18 for each SIM partner 108, for example, in a key vault 40 in a secure datastore 120. The SIM partner 108 and the mobile network service 104 may exchange the transport key 18 one time during the onboarding or initiation of the SIM partner 108 with the cloud computing system 102.

At 904, method 900 may include receiving a request from a user to establish a private mobile network provided by the cloud computing system. The mobile network service 104 may receive a private network request 14 from a user 106 to develop a private mobile network 10. The mobile network service 104 may provide a mobile network portal 12 (e.g., a website) through which the users 106 may create and manage one or more private mobile networks 10.

One or more graphical user interfaces on the mobile network portal 12 may provide different options for the user 106 to choose from when building the private mobile network 10. In addition, the one or more graphical user interfaces may allow the user 106 to input different selections for the private mobile network 10. For example, the graphical user interfaces may provide the users 106 with a list of SIM partners associated with the cloud computing system 102 that the user 106 may select from when choosing a SIM partner 108 for use with the private mobile network 10. The user 106 may select a SIM partner 108 from the list of SIM partners for providing the SIM cards 20 for the private mobile network. The user 106 may also provide inputs or selections for a number of SIM cards 20 for use with the private mobile network, a network name, a PLMN to use for the private mobile network, one or more locations or regions for the private mobile network, and/or a selected packet core partner 110 to use with the private mobile network.

A private network request 14 may be generated based on the different selections and/or inputs provided by the user 106 for the private mobile network 10. The private network request 14 may include a request to create a new private mobile network 10. The private network request 14 may also include request to manage an existing private mobile network 10 and/or a request to modify an existing private mobile network 10. The private network request 14 may also include private network information 12 for the private mobile network 10 (e.g., the information provided by the user 106 using the graphical user interfaces of the mobile network portal 12). The private network information 12 may include, but is not limited to, the selected SIM partner 108, a selected packet core partner 110, a number of SIM cards 20 for use with the private mobile network 10, a network name, a PLMN to use (e.g., a PLMN of the user's choice or the PLMN provided by the SIM partner), one or more locations for the private mobile network 10, and/or user information (e.g., company name, representative name, contact information, address).

At 906, method 900 may include providing a service key for the private mobile network. The mobile network service 104 may receive the private network request 14 and may generate a SIM service key 32 for the private mobile network 10. The SIM service key 32 may identify each private mobile network 10 in cloud computing system 102. In an implementation, the SIM service key 32 is a GUID that creates a unique identifier of the private mobile network 10. If the user 106 is creating a new private mobile network 10, a new SIM service key 32 is generated and provided to the user 106 for the private mobile network 10. If a customer is adding SIM cards 20 to an existing private mobile network 10 and/or removing SIM cards 20 from an existing private mobile network 10, the existing SIM service key 32 for the private mobile network 10 is provided to the user 106. The mobile network service 104 may provide the SIM service key 32 to the user 106. The user 106 may provide the SIM service key 32 to the selected SIM partner 108 during the purchase of the SIM cards 20 from the SIM partner 108.

At 908, method 900 may include receiving encrypted SIM operation details for the SIM cards for use with the private mobile network. Upon completion of a purchase of SIM cards 20 by a user 106 for a private mobile network 10 from a SIM partner 108, the mobile network service 104 may receive the SIM operations details 24 for the purchased SIM cards 20 from the SIM partner 108 via the SIM partner API 16. The SIM operations details 24 may include, but are not limited to, the international mobile subscriber identity (IMSI) values for the SIM cards 20, the integrated circuit card identifier (ICCID) values for the SIM cards 20, the Ki values 28 and OPc values 30 for each SIM profile 26, and/or the SIM secret value 30 for each SIM profile 26. The SIM partner 108 may encrypt the SIM operations details 24 using the transport key 18 to securely transmit the SIM operations details 24 to the mobile network service 104.

At 910, method 900 may include decrypting the encrypted SIM operation details using the transport key. The mobile network service 104 decrypts the received SIM operations details 24 using the transport key 18. The mobile network service 104 may perform one or more conflict checks for the SIM operations details 24 to ensure that other networks are not using the same SIM operations details 24. For example, if the mobile network service 104 determines that the IMSI values for the SIM cards 20 overlap with other values already stored in the secure datastore 120, the mobile network service 104 sends a notification to the SIM partner 108 alerting the SIM partner 108 that those IMSI values are already in use. As such, the mobile network service 104 may ensure that the IMSI ranges for the SIM cards 20 using the private mobile network 10 are not already assigned to a different private mobile network 10, and thus, overlapping of the IMSI ranges may be prevented.

At 912, method 900 may include storing the SIM operation details. The mobile network service 104 may securely store the SIM operations details 24 for the private mobile network 10 in a secure datastore 120. The secure datastore 120 may include a user subscription 44 for each user 106 of the cloud computing system 102. The user subscription 44 may include one or more private mobile networks 10 associated with the user 106. The user subscription 44 may include the SIM profiles 26 of the SIM cards 20 that may use the private mobile network 10 and the SIM operations details 24 associated with each of the SIM profiles 26. The user subscription 44 may also include the mobile core information 42 with details about the mobile cores 114, 118 for each of the private mobile networks 10.

At 914, method 900 may include transmitting the SIM operation details to a packet core partner for use with the private mobile network. The mobile network service 104 may communicate the SIM operations details 24 and the private network information 12 to the packet core partner 110. In some implementations, the packet core partner 110 is an Evolved Packet Core (EPC) partner. The mobile network service 104 may populate the HSS pool 36 or the UDM pool 38 at the packet core partner 110 with the SIM operation details 24 for the SIM cards 20 of the devices that may access the private mobile network 10. Upon activation or deactivation of one or more devices on the private mobile network 10, the packet core partner 110 may verify the SIM cards 20 of the devices trying to access the private mobile network 10, with the information stored in the HSS pool 36 or the UDM pool 38.

As such, method 900 may be used by a private mobile network service 104 on a cloud computing system 102 to manage the SIM information for a private mobile network 10 upon receiving a request to create a private mobile network 10 and/or receiving a request to add more SIM cards 20 to an existing private mobile network 10.

Figure 10:
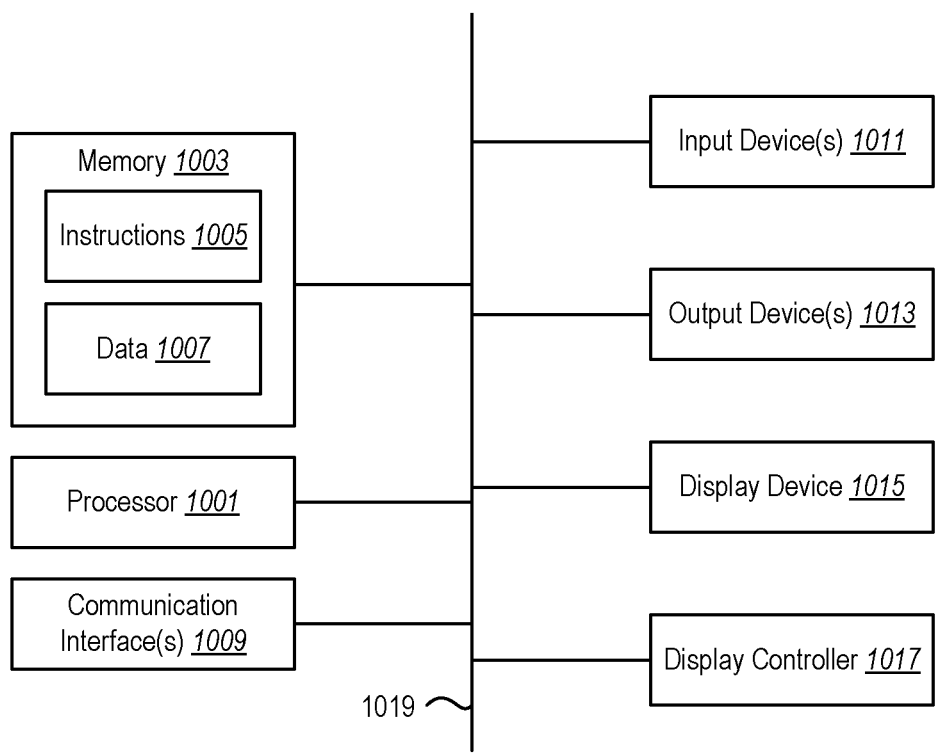
FIG. 10 illustrates certain components that can be included within a computing device.

FIG. 10 illustrates certain components that may be included within a computer system 1000. One or more computer systems 1000 may be used to implement the various devices, components, and systems described herein.

The computer system 1000 includes a processor 1001. The processor 1001 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for subscriber identification module (SIM) management of SIM cards for use on one or more edge devices on a private mobile network, the method comprising:
    exchanging a transport key to securely exchange SIM secrets with a SIM partner that provides SIM cards;
    receiving, at a private mobile network service, a request from a user to add a plurality of SIM cards to a private mobile network provided by the private mobile network service, wherein the request identifies the SIM partner for providing the plurality of SIM cards for a plurality of devices to use on the private mobile network;
    transmitting, by the private mobile network service to the user, a SIM service key associated with the private mobile network; and
    receiving, at the private mobile network service through an application programming interface (API) of the SIM partner, encrypted SIM operation details for each SIM profile of the plurality of SIM cards for use with the private mobile network based on the SIM partner receiving the SIM service key from the user, wherein the SIM operation details include unique Ki and operator code (OPc) values for each SIM profile of the plurality SIM cards, and wherein the Ki and OPc values are generated by the SIM partner and programmed during manufacturing of the SIM cards.

2. The method of claim 1, further comprising:
    securely transmitting the SIM operations details to a packet core partner for use with the private mobile network.

3. The method of claim 2, wherein the packet core partner stores the SIM operations details for the private mobile network and performs an authentication of devices trying to access the private mobile network using the SIM operation details.

4. The method of claim 1, wherein the SIM operations details include an international mobile subscriber identity (IMSI) values and integrated circuit card identifier (ICCID) values for the SIM cards.

5. The method of claim 4, wherein the SIM operations details are exchanged between the private mobile network service and the SIM partner as a substitute for a SIM ceremony between the SIM card and the private mobile network service.

6. The method of claim 1, wherein the request further includes an identification of one or more of international mobile subscriber identity (IMSI) values for the SIM cards, a public land mobile network (PLMN) for the private mobile network, one or more locations for the private mobile network, or a network name for the private mobile network.

7. The method of claim 6, further comprising:
    performing one or more conflict checks to verify that the IMSI values or the PLMN are not already in use by other networks in a cloud computing system.

8. The method of claim 1, wherein the SIM provider is one of a plurality of SIM partners associated with the cloud computing system.

9. The method of claim 1, wherein securely storing the SIM operation details further includes encrypting, by the private mobile network service, the SIM operation details before securely storing.

10. The method of claim 1, wherein the SIM secrets include a combination of the OPc values and the Ki values.

11. A device, comprising:
    one or more processors;
    memory in electronic communication with the one or more processors; and
    instructions stored in the memory, the instructions being executable by the one or more processors to:
        exchange a transport key to securely exchange SIM secrets between a private mobile network service implemented on one or more edge devices and a SIM partner that provides SIM cards;
        receive, at the private mobile network service, a request from a user to add a plurality of SIM cards to a private mobile network provided by the private mobile network service, wherein the request identifies the SIM partner for providing the plurality of SIM cards for a plurality of devices to use on the private mobile network;

transmit, by the private mobile network service to the user, a SIM service key identifying the private mobile network;

receive, at the private mobile network service, through an application programming interface (API) of the SIM partner, encrypted SIM operation details for each SIM profile of the plurality of SIM cards for use with the private mobile network based on the SIM partner receiving the SIM service key from the user, wherein the SIM operation details include unique Ki and operator code (OPc) values for each SIM profile of the plurality of SIM cards, and wherein the Ki and OPc values are generated by the SIM partner and programmed during manufacturing of the SIM cards;

decrypt, by the private mobile network service, the encrypted SIM operation details using the transport key; and securely store the SIM operation details for each SIM profile for use with the private mobile network.

12. The device of claim 11, further comprising:
securely transmitting the SIM operations details to a packet core partner for use with the private mobile network.

13. The device of claim 12, wherein the packet core partner stores the SIM operations details for the private mobile network and performs an authentication of devices trying to access the private mobile network using the SIM operation details.

14. The device of claim 11, wherein the SIM operations details include an international mobile subscriber identity (IMSI) values and integrated circuit card identifier (ICCID) values for the SIM cards.

15. The device of claim 14, wherein the SIM operations details are exchanged between the private mobile network service and the SIM partner as a substitute for a SIM ceremony between the SIM card and the private mobile network service.

16. The device of claim 11, wherein the request further includes an identification of one or more of international mobile subscriber identity (IMSI) values for the SIM cards, a public land mobile network (PLMN) for the private mobile network, one or more locations for the private mobile network, or a network name for the private mobile network.

17. The device of claim 16, wherein the instructions are further executable by the one or more processors to:
perform one or more conflict checks to verify that the IMSI values or the PLMN are not already in use by other networks in a cloud computing system.

18. The device of claim 11, wherein the instructions are further executable by the one or more processors to:
encrypt, by the private mobile network service, the operation details before securely storing.

19. A method for integrating SIM partners for private mobile networks implemented on one or more edges devices to use with a cloud computing system, comprising:
establishing an interface for communicating with a plurality of SIM partners using a private mobile network service;

exchanging with each SIM partner of the plurality of SIM partners a transport key unique to the SIM partner, wherein the transport key is used to encrypt communications between the private mobile network service and the SIM partners;

receiving a request from a user to establish a private mobile network provided by the cloud computing system, wherein the request identifies a SIM partner of the plurality of SIM partners for providing SIM cards for use with the private mobile network;

providing, to the user, a SIM service key associated with the private mobile network for the user to provide to the identified SIM partner when purchasing the SIM cards, wherein the SIM service key uniquely identifies the private mobile network;

receiving, from the identified SIM partner in response to the user providing the SIM service key to the identified SIM partner upon purchase of the SIM cards, encrypted SIM operations details for each SIM profile of the SIM cards for use with the private mobile network, wherein the SIM operations details include unique Ki and operator code (OPc) values for each SIM profile of the plurality of SIM cards, and wherein the Ki and OPc values are generated by the SIM partner and programmed during manufacturing of the SIM cards;

decrypting the encrypted SIM operations details using the transport key; and securely storing the SIM operations details for each SIM profile for use with the private mobile network.

20. The method of claim 19, wherein the interface is a SIM partner application programming interface.

* * * * *